Oct. 16, 1962
L. KRIPAK
3,058,259
TOY
Filed Aug. 31, 1961
2 Sheets-Sheet 1
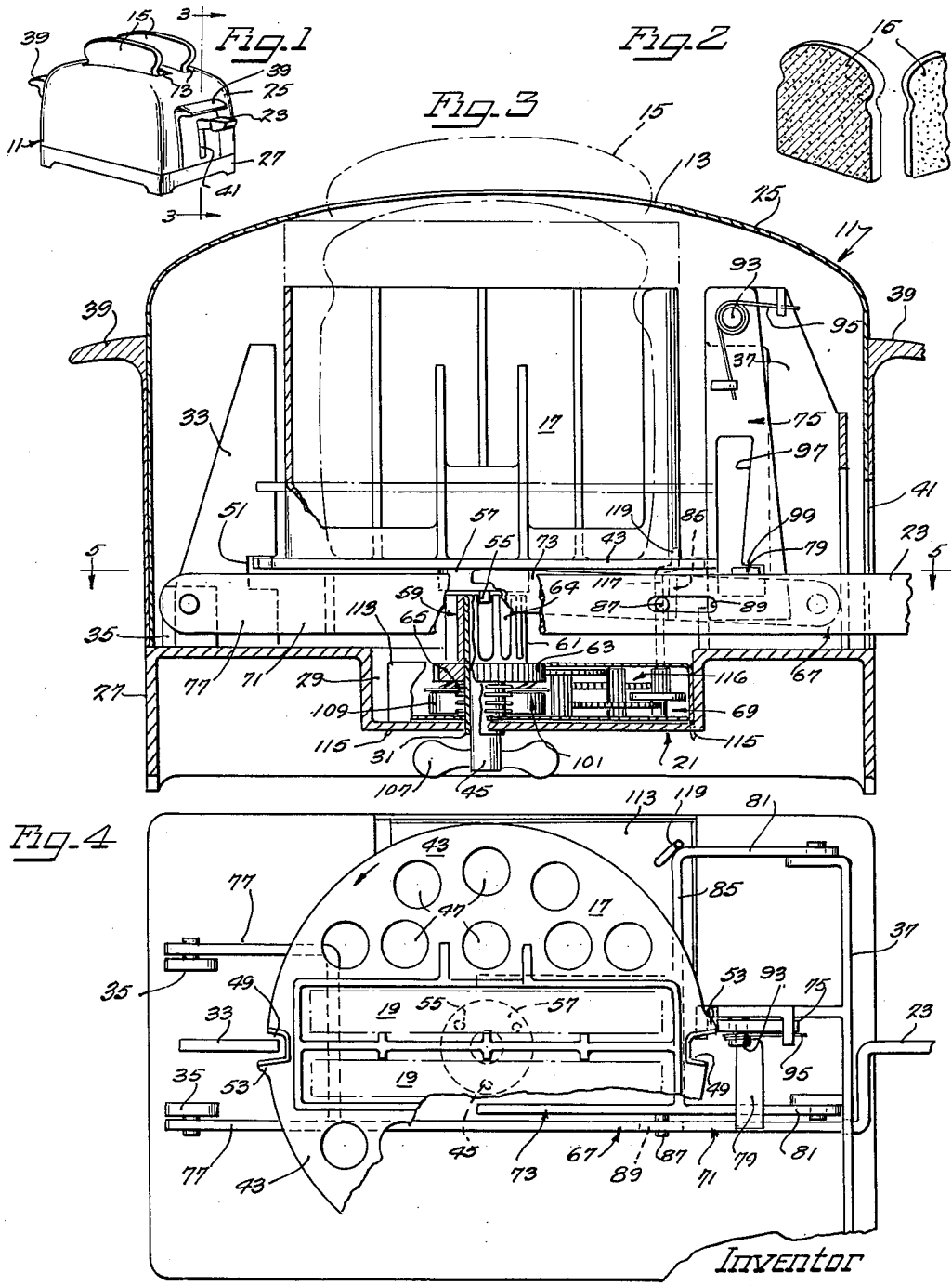
Inventor
LEONID KRIPAK
By Soans, Anderson, Luedeka & Fitch
Attys Oct. 16, 1962   L. KRIPAK   3,058,259
TOY
Filed Aug. 31, 1961   2 Sheets-Sheet 2
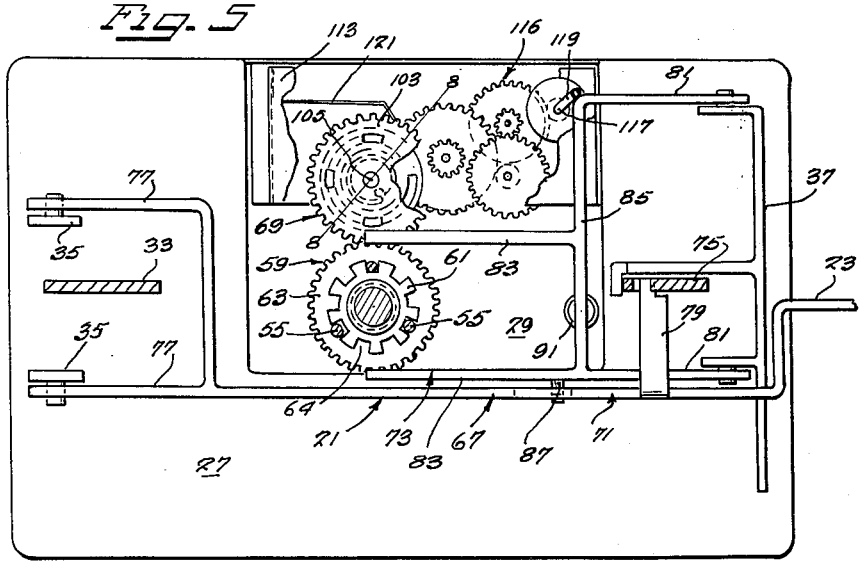
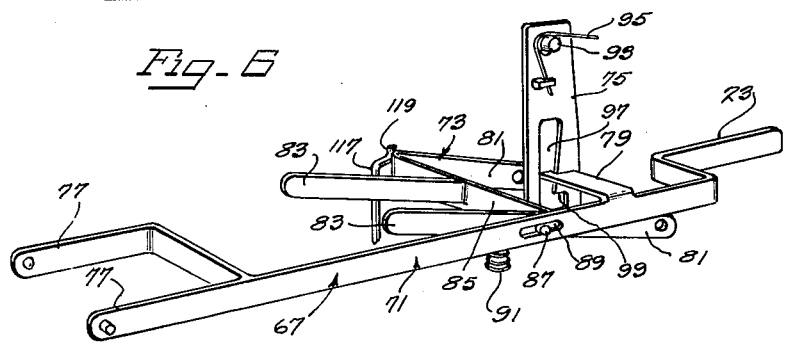
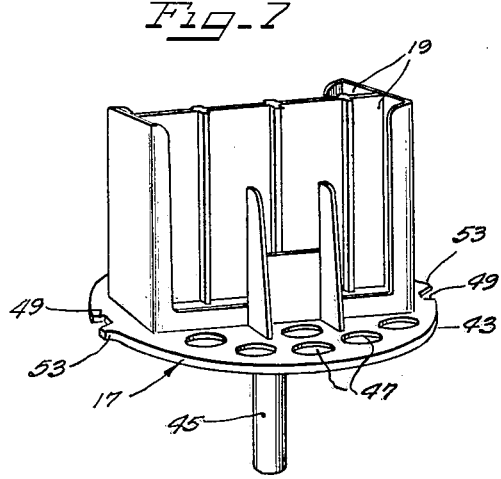
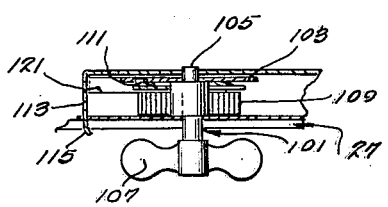
Inventor
LEONID KRIPAK
By Soans, Anderson, Luedeka & Fitch
Att'ys United States Patent Office 3,058,259
Patented Oct. 16, 1962

3,058,259
TOY
Leonid Kripak, Villa Park, Ill., assignor to
Marvin I. Glass, Chicago, Ill.
Filed Aug. 31, 1961, Ser. No. 135,303
6 Claims. (Cl. 46—14)

The invention relates to a toy toaster and more particularly to a toy toaster which can be simply operated by a child, and which simulates the operation of an actual toaster.

Toys in the form of home appliances have a built-in attraction for youngsters who seem to be particularly interested in appliances often used by their parents. Young girls especially delight in being "mother's little helper" and are particularly drawn to toy simulated kitchen appliances which can be used in their world of pretending. One kitchen appliance which is generally used daily and has particular appeal to youngsters is the toaster.

Accordingly, the principal object of the invention is to provide a simply operated toy toaster which closely simulates the appearance and operation of an actual toaster. Another object of the invention is the provision of a toy toaster incorporating certain features such as a pop-up action, a ticking sound, and/or, a change, as seen by the user, in the appearance of simulated bread slices from an "untoasted" to a "toasted" condition. It is also an object of the present invention to provide a toy toaster which has a pleasing and attractive appearance.

Further objects of the invention are apparent by reference to the accompanying drawings and the following description of a preferred embodiment thereof. In the drawings:

FIGURE 1 is a perspective view of a toaster in accordance with the invention;

FIGURE 2 is a perspective view of two simulated bread slices illustrating the different appearance of each side of the simulated slices;

FIGURE 3 is an enlarged, sectional view with portions broken away, taken substantially along line 3—3 of FIGURE 1;

FIGURE 4 is a plan view of the toaster with a part of the housing removed and with portions broken away;

FIGURE 5 is a sectional view taken substantially along line 5—5 of FIGURE 3;

FIGURE 6 is a perspective view of a part of the operating mechanism shown removed from the toaster;

FIGURE 7 is a perspective view of the turntable incorporated in the toaster shown in FIGURE 1; and FIGURE 8 is a sectional view of the spring motor taken along line 8—8 of FIGURE 5.

The toy toaster illustrated in the drawings includes a housing 11 which resembles a toaster and has, in its top, two rectangular slots 13 for receiving a pair of bread slices 15. Each bread slice 15 simulates the appearance of actual bread and is fashioned so that one side has a "toasted" appearance, while the other side has a plain or "untoasted" appearance, as shown in FIGURE 2. Disposed within the housing 11 is a depressible turntable 17 having two receptacles 19 which are adapted for receiving the bread slices 15 and are alignable with the slots 13 in the top of the housing 11. The turntable 17 is lowered, rotated and raised, as will be explained, by an operating mechanism 21, controlled by an actuating arm 23 extending exteriorly of the housing 11.

In operation, the bread slices 15 are initially inserted through the rectangular slots 13 into the receptacles 19 of the turntable 17 with their "untoasted" side facing the user of the toy. When the actuating arm 23 is depressed the turntable 17 containing the bread slices 15 is first lowered to a position where the bread slices 15 are completely within the housing 11. This depressed position of the turntable 17 is shown in FIGURE 3, while the initial or elevated position is shown in phantom. The turntable 17 is then revolved by the operating mechanism 21, approximately 180°. When this position is reached, the operating mechanism 21 serves to "pop" the bread slices 15 through the slots 13, in the housing 11 with their "toasted" side toward the user of the toy, thereby realistically giving the impression that the bread has been toasted.

Referring now more particularly to the drawings, the illustrated housing 11 includes a cover 25 and a base 27. The base 27, which resembles any toaster base, provides a seat upon which the cover 25 rests. The base 27 has formed in its surface a cavity 29 to hold part of the operating mechanism 21, in which cavity 29 is located a vertical hollow post or bushing 31 which supports the turntable 17. Attached to the horizontal surface of the base 27 are an alignment element 33, supporting pieces 35, and a supporting bracket 37, the functions of which will be later described. The housing cover 25 has the two rectangular slots 13 in its top surface through which the bread slices 15 can be inserted and has, on each of its ends, a handle bar or ledge 39. As shown in FIGURE 1 one end of the housing 11 includes a vertically extending slot 41 through which the actuating arm 23 extends. The housing 11 is preferably made of a rigid, strong, durable plastic which provides for inexpensive manufacture and a pleasing appearance.

The bread slices 15 which are insertable through the slots 13 into the receptacles 19 of the turntable 17 are fashioned in the shape of a regular slice of white bread, and are preferably made from a plastic sheet material with sponge-like characteristics. As shown in FIGURE 2, one side of each of the slices 15 has the appearance of plain untoasted white bread and the other side has the color and appearance of toast.

The turntable 17, as shown in FIGURE 7, includes a disc 43, a post or shaft 45, depending from the disc 43 for rotatable engagement in the bushing 31 in the toaster base 27, and the before-mentioned pair of receptacles 19 which are mounted on the disc 43. The receptacles 19 are of such a size and so positioned that, when the toaster is assembled, they are alignable with, and directly below, the slots 13 in the housing 11. Thus, the receptacles 19 will receive the bread slices 15 when the slices 15 are inserted through the slots 13 in the housing 11. The disc 43 contains a plurality of holes 47 formed in its surface which lighten the turntable 17, but do not affect its mechanical function.

To align the turntable 17 with the slots 13 in the housing 11, two alignment notches 49 are formed in the edge of the disc 43, 180° apart, as seen in FIGURE 4. These notches 49 cooperate with the alignment element 33 mounted on the toaster base 27, to position the turntable 17 so that the receptacles 19 are aligned with the slots 13 whenever the turntable 17 is in the elevated position. When the turntable 17 is in its depressed position, a slot 51 in the element 33 allows the turntable 17 to rotate freely.

Also included on the edge of the turntable disc 43 are a pair of ears 53 adjacent the notches 49. The ears 53 actuate a part of the operating mechanism 21 to provide for the elevation of the turntable 17 after it has been properly rotated. As such, the ears 53 are positioned relative to the notches 49 so that one of the ears 53 engages the operating mechanism 21 when the notch 49 generally across the disc 43 from it is in line with the alignment element 33, and thus positioned to allow the turntable 17 to be elevated.

Serving as an axis of rotation for the turntable 17, the shaft 45 extends vertically downward from the disc 43. The shaft 45 is of a sufficient length that it is in contact with the inner supporting surfaces of the cylindrical bushing 31, in which it resides, whether the turntable 17 is in the depressed or elevated position. Rotational movement is imparted to the turntable 17 by the operating mechanism 21 through a set of three fingers 55 which are laid out in a circular pattern approximately 120° apart, as illustrated in FIGURE 5, and project from a hub 57 which is concentrically located about the shaft 45 at the point where the shaft 45 joins the underside of the disc 43. These fingers 55 reach into and engage a correspondingly slotted drive element 59 upon which the hub 57 rests when the turntable 17 is in the depressed position.

The drive element 59 which links the turntable 17 to the operating mechanism 21 is generally cylindrical in shape, having an upper vertically grooved or slotted portion 61 and a lower portion 63 cut to form gear teeth, and is rotatable about the outside surface of the cylindrical bushing 31. This upper portion 61 contains slots 64 spaced in corresponding positions to the position of the fingers 55. To prevent disengagement of the element 59 from the bushing 31, the bushing 31 is peened at its top.

In order to bias the element 59 upwardly into a position where the gear teeth on its lower geared portion 63 will mesh with the operating mechanism 21, a spring 65 is disposed about the outer surface of the bushing 31, between the toaster base 27 and the drive element 59. The spring 65 also allows the weight of the turntable 17 to depress the drive element 59 so that the turntable 17 will always move the entire distance to its depressed position, whether or not the fingers 55 on the hub 51 are in position to immediately engage the correspondingly spaced slots 64 in the upper portion 61 of the drive element 59. The vertical height of the lower geared portion 63 of the element 59 is sufficient to always maintain this portion 63 in contact with the operating mechanism 21. If the fingers 55 should not immediately engage the slots 64 in the drive element 59, the rotation of the element 59 by the operating mechanism 21 will quickly bring a set of three slots 64 into alignment with the fingers 55, thereby allowing the spring 65 to move the element 59 upward into engagement with the fingers 55 of the hub 57 linking the element 59 and the turntable 17 for the transmission of rotative movement.

The operating mechanism 21 comprises an elevating mechanism 67 and a rotational mechanism 69. The elevating mechanism 67 comprises an actuating lever 71, an elevating lever 73, and a control element 75, as illustrated in FIGURE 6.

The actuating lever 71 has at one end the actuating arm 23 which extends outside the housing 11 to afford operation of the toy. The other end of the lever 71 is forked into two members 77 which are apertured to receive pins extending from the supporting pieces 35 in the toaster base 27. Thus, when assembled, the actuating lever 71 is supported at one end by these rotative connections, whereas the other end resides in the end slot 41 of the toaster housing 11. Intermediate the ends of the lever 71 is a locking bar 79 which extends to one side of the lever 71 generally at a right angle to it. The inter-engagement of this bar 79 and the control element 75 serves to control the movement of the elevating mechanism 67, as will be later described.

The elevating lever 73 is generally H-shaped having two supporting arms 81 extending in one direction and two elevating arms 83 extending in the opposite direction from a cross bar or member 85. The supporting arms 81 are apertured to receive pins extending from parts of the support bracket 37 which is mounted on the toaster base 27. Thus, the elevating lever 73 is supported by these pivotable connections in the support arms 81 and by interconnection with the actuating lever 71 through a pin 87 engaged in a lost motion slot 89 in the actuating lever 71. This arrangement leaves the ends of the elevating arms 83 free to move in a vertical arc. The elevating arms 83 are located so as to be positioned one on each side of the turntable shaft 45. When the toaster is assembled, the bottom of the turntable disc 43 rests on the ends of the elevating arms 83; thus angular movement of the elevating lever 73 imparts vertical movement to the turntable 17.

To bias the elevating lever 73 in an upward direction, a spring 91 is provided. The cross bar 85 of the lever 73 is notched along its bottom to accept this spring 91 which is affixed to a knob (not shown) on the toaster base 27. This upward bias is transmitted to the actuating lever 71 through the pin 87 and lost motion slot 89.

The control element 75, a vertical bar pivotably suspended from a pin 93 on the center portion of the support bracket 37, controls the movement of the levers 71, 73. A retaining spring 95, disposed about this supporting pin 93, serves both to hold the element 75 on the pin 93 and to bias its lower end inwardly toward the toaster center. The control element 75 is positioned so that the end of the locking bar 79 of the actuating lever 71 resides in a camming slot 97 in the control element 75. This camming slot 97 is constructed with a shoulder 99 projecting inwardly above the bottom of the slot 97. When the actuating lever 71 is depressed so that the locking bar 79 travels to the bottom of the slot 97, the retaining spring 95 holds the control element 75 in a position where the shoulder 99 blocks the upward passage of the locking bar 79, thus retaining it and the levers 71, 73 in this depressed position.

In order to release the elevating mechanism 67 from this depressed position, the two before-mentioned control ears 53 are provided. Because the control element 75 is positioned very close to the perimeter of the turntable disc 43, illustrated in FIGURE 4, as the disc 43 revolves counter-clockwise as viewed from FIGURE 4, the leading camming edge of the control ear 53 engages the edge of the control element 75, forcing the element 75 outward. The shoulder 99 thus slides outward over the top of the locking bar 79, freeing it to move upward.

The rotational mechanism 69 comprises a spring motor 101, including a drive gear 103 and an auxiliary gearing arrangement for control purposes.

The drive gear 103 is rotatably mounted on a shaft 105 and transmits power from the rotational mechanism 69 to the drive element 59. Also carried on this shaft 105 are a wind-up handle 107, a power spring 109, and a simple clutch 111. The shaft 105 is journaled in the top and bottom of a gear box 113 which resides in the cavity 29 provided in the toaster base 27 and is held in place by studs 115. An opening in the cavity 29 allows the shaft 105 to extend below the toaster base 27, making the handle 107 accessible for winding-up the spring motor 101.

As a means for starting and stopping the operation of the rotational mechanism 69, a gear train 116 including four gear and pinion assemblies, and a brake 117 are provided. The gear train 116 is located in the gear box 113 and is arranged, as shown in FIGURE 5, to rotate the final shaft in the series at a speed considerably greater than the drive gear 103. The brake 117 is an extension of this final shaft and has, at its top, an offset arm 119. This arm 119 is positioned so as to contact the cross bar 85 of the elevating lever 73 whenever the lever 73 is in its raised position. When this contact is made, the brake 117 halts the entire gear train 116 thus stopping the operation of the rotational mechanism 69. The relatively high speed of rotation of the brake 117 provided by the gearing arrangement, assures immediate stoppage of the gear train 116 because the arm 119 will quickly contact the elevating lever 73 as soon as the lever 73 moves to its raised position.

To produce a ticking noise, similar to that commonly associated with an ordinary toaster, a sound-producing element 121 in the form of a spring blade is provided. This element 121 is also positioned inside the gear box 113 so that it contacts the teeth of the drive gear 103, in order to produce the ticking sound whenever the toy is in operation.

After the spring motor 101 is wound up and the toaster is ready for use, the turntable 17 is in the elevated position and the actuating arm or handle 23 is at the top of the slot 41. The two bread slices 15 are then inserted into the slots 13 in the top of the toaster with their "untoasted" side facing the user. The bread slices 15 are received by the receptacles 19 in the turntable 17 and protrude partially from the top of the housing 11 as do slices in an actual toaster.

The user then depresses the arm 23 of the actuating lever 71 to the bottom of the slot 41. As this lever 71 is depressed, the locking bar 79 moves downward in the camming slot 97 of the control element 75. When the bar 79 passes the shoulder 99, the inward bias of the control element 75 provided by the retaining spring 95 positions the shoulder 99 vertically above the locking bar 79, thus holding the actuating lever 71 in its depressed position.

Inasmuch as the downward motion of the actuating lever 71 is transmitted to the elevating lever 73 through the pin 87 and slot 89 connection, the elevation arms 83 of the lever 73 accordingly swing in a downward arc. The turntable 17 which rests upon the ends of these arms 83 moves correspondingly downward, its shaft 45 sliding vertically in the cylindrical bushing 31. When the turntable 17 reaches its final or depressed position, the bread slices 15 are wholly below the cover 25.

As the turntable 17 approaches this depressed position, the downward motion of the elevating lever 73 causes the cross bar 85 to move below the level of the brake arm 119, thereby releasing the brake 117. The release of the brake 117 frees all of the gears in the gear train 116 and allows the spring motor 101 to rotate the drive gear 103 in a clockwise direction, as viewed in FIGURE 4. The drive gear 103 meshes with the geared portion 63 of the drive element 59, turning it counterclockwise.

When the turntable hub 57 reaches the top of the drive element 59, the fingers 55 engage the element 59 by falling into its correspondingly slotted portion 61. The turntable 17 is thus rotated counter-clockwise, accompanied by the ticking sound produced by the interaction of the sound producing element 121 and the teeth of the moving drive gear 103.

When the turntable 17 has been turned approximately 180°, one of the control ears 53 protruding from the disc 43 contacts the inner edge of the control element 75 forcing the element 75 outwardly by overcoming the bias of the spring 95. This movement causes the shoulder 99 to slide off the top of the locking bar 79, releasing the actuating lever 71. Thus, the upward bias of the elevating lever 73, caused by the spring 91, takes effect and the upward movement of elevating arms 83 of the lever 73 propels the turntable 17 upward. The actuating lever 71 likewise moves upward because of its inter-connection with the elevating lever 73. As soon as the elevating lever 73 reaches its upper position, its cross bar 85 blocks the movement of the brake arm 119, stopping the rotational mechanism 69.

The apparent effect viewed by the user of the toy is that of the two bread slices 15 popping through the slots 13, the actuating arm 23 returning to its upper position, and the discontinuance of the "ticking" sound. Since the turntable 17 has been rotated a one-half turn, the "toasted" sides of the bread slices 15 now face the user of the toy, giving the impression that the bread has been toasted.

Various of the features of the invention are set forth in the appended claims.

What is claimed is:
1. A toy toaster comprising, a housing having a generally rectangular opening in the top thereof, a receptacle mounted in said housing for rotational movement about a vertical axis and for linear movement along said axis between elevated and depressed positions, said receptacle being adapted for receiving an article of sheet formation, an article of sheet formation having one side simulating the appearance of bread and having its other side simulating the appearance of toast, and means for lowering said receptacle to said depressed position, for automatically rotating said receptacle when in said depressed position, and for automatically effecting return of said receptacle to said elevated position when said receptacle has rotated one-half turn.

2. A toy toaster comprising, a housing having a generally rectangular opening in the top thereof, a receptacle mounted in said housing for rotational movement about a vertical axis and for linear movement along said axis between elevated and depressed positions, said receptacle being adapted for receiving an article of sheet formation, an article of sheet formation having one side simulating the appearance of bread and having its other side simulating the appearance of toast, means for lowering said receptacle to said depressed position and for effecting return of said receptacle to said elevated position when said receptacle has rotated one-half turn, and means for automatically rotating said receptacle when in said depressed position and for discontinuing said rotation when said receptacle is in said elevated position.

3. A toy toaster comprising, a housing having a generally rectangular opening in the top thereof, a receptacle mounted in said housing for rotational movement about a vertical axis and for linear movement along said axis between elevated and depressed positions, said receptacle being adapted for receiving an article of sheet formation, an article of sheet formation having one side simulating the appearance of bread and having its other side simulating the appearance of toast, means for lowering said receptacle to said depressed position, means for automatically rotating said receptacle when in said depressed position, means for automatically effecting return of said receptacle to said elevated position when said receptacle has rotated one-half turn, and means for automatically discontinuing operation of said rotating means when said receptacle is in said elevated position.

4. A toy toaster comprising, a housing having a generally rectangular opening in the top thereof, a receptacle mounted in said housing for rotational movement about a vertical axis and for linear movement along said axis between elevated and depressed positions, said receptacle being adapted for receiving an article of sheet formation, an article of sheet formation having one side simulating the appearance of bread and having its other side simulating the appearance of toast, means for lowering said receptacle to said depressed position, means for automatically rotating said receptacle when in said depressed position, means for producing a ticking sound during rotation of said receptacle, means for effecting return of said receptacle to said elevated position when said receptacle has rotated one-half turn, and means for automatically discontinuing operation of said rotating means when said receptacle is in said elevated position.

5. A toy toaster comprising, a housing having a generally rectangular opening in the top thereof, a receptacle mounted in said housing for rotational movement about a vertical axis and for linear movement along said axis between elevated and depressed positions, said receptacle being adapted for receiving an article of sheet formation, an article of sheet formation having one side simulating the appearance of bread and having its other side simulating the appearance of toast, means for lowering said receptacle to said depressed position, means for automatically rotating said receptacle when in said depressed position, means for automatically effecting return of said receptacle to said elevated position when said receptacle has rotated one-half turn, and means for automatically discontinuing operation of said rotating means when said receptacle is in said elevated position.

6. A toy toaster comprising a housing having a pair of generally rectangular openings in the top thereof, a turntable mounted in said housing for rotational movement about a vertical shaft and for linear movement along said shaft between elevated and depressed positions, said turntable including a pair of control ears and a pair of receptacles each being adapted for receiving an article of sheet formation when said turntable is in said elevated position, an article of sheet formation having one side simulating the appearance of bread and having its other side simulating the appearance of toast, an actuating lever having a forked end pivotally mounted on said housing, an intermediate offset locking bar, and an opposite free end extending exteriorly of said housing to control operation of said toy, an elevating lever having two supporting arms pivotally mounted on said housing, a cross bar connecting said supporting arms, two elevating arms extending from said cross bar and engaging said turntable, and a pin and slot connection interconnecting one of said elevating arms and said actuating lever so as to raise and lower said turntable incident to pivotable movement of said actuating lever, means biasing said actuating lever to raise said turntable to said elevated position, a spring motor, a drive gear connectable with said turntable to rotatively drive said turntable and connected to said motor by a clutch, a brake connected to said drive gear by a gear train and operated by said cross bar to permit driving of said turntable when in said depressed position and to halt rotation of said turntable when in said elevated position, means for producing a ticking sound during rotation of said turntable, and a control element, pivotably mounted on said housing for movement relative to a position restraining said locking bar so as to retain said turntable in said depressed position, said control element being biased toward said restraining position and being engageable by one of said control ears after rotation of said ear 180° to disengage said locking bar and effect return of said turntable to said elevated position by said biasing means.

References Cited in the file of this patent

UNITED STATES PATENTS 2,997,807  Woron ---------------- Aug. 29, 1961